US012089572B2

(12) United States Patent
Marks et al.

(10) Patent No.: US 12,089,572 B2
(45) Date of Patent: Sep. 17, 2024

(54) FLEECE FILTERS FOR USE IN AQUATIC INSTALLATIONS

(71) Applicant: RED SEA AQUATICS DEVELOPMENT LTD., Herzlia (IL)

(72) Inventors: Neil H. Marks, Ra'anana (IL); Tamer Aita, Taybeh (IL)

(73) Assignee: RED SEA AQUATICS DEVELOPMENT LTD., Herzlia (IL)

( * ) Notice: Subject to any disclaimer, the term of this patent is extended or adjusted under 35 U.S.C. 154(b) by 0 days.

(21) Appl. No.: 18/568,309

(22) PCT Filed: Jun. 3, 2022

(86) PCT No.: PCT/IL2022/050594
§ 371 (c)(1),
(2) Date: Dec. 8, 2023

(87) PCT Pub. No.: WO2022/259239
PCT Pub. Date: Dec. 15, 2022

(65) Prior Publication Data
US 2024/0260552 A1    Aug. 8, 2024

(30) Foreign Application Priority Data
Jun. 9, 2021   (IL) .......................................... 283846

(51) Int. Cl.
*A01K 63/04*     (2006.01)
*B01D 29/09*     (2006.01)
(Continued)

(52) U.S. Cl.
CPC ............ *A01K 63/045* (2013.01); *B01D 29/09* (2013.01); *B01D 33/044* (2013.01)

(58) Field of Classification Search
CPC ..... A01K 63/045; B01D 29/09; B01D 33/044
(Continued)

(56) References Cited

U.S. PATENT DOCUMENTS 4,282,095 A * 8/1981 Tsuhako ............... A01K 63/045
210/387

FOREIGN PATENT DOCUMENTS

CN   207269655 U * 4/2018
CN   212731253 U * 3/2021
(Continued)

OTHER PUBLICATIONS

Machine-generated English translation of DE 102020100873, generated on May 30, 2024.*

(Continued)

*Primary Examiner* — Fred Prince
(74) *Attorney, Agent, or Firm* — Panitch Schwarze Belisario & Nadel LLP

(57) ABSTRACT

Fleece filter including a filter chamber and a fleece retainer for intimately retaining fleece against inside primary filter chamber plates on being extended between a feed reel and a take-up reel. Fleece filter including a fleece filter controller having a feed reel with a feed reel encoder for enabling accurate measurement of fresh fleece dispensed from a fleece roll wherein a length of fresh fleece is a function of a fleece roll's instantaneous external diameter, fleece thickness, and a number of rotations of fleece unwound from a feed reel. Fleece filter including a fleece filter housing having a polluted water inlet, a filtered water outlet and a chemical media basket mounted on the filtered water outlet such that substantially the entire flow of filtered water from the filtered water outlet immediately subsequently passes through the chemical media basket.

12 Claims, 14 Drawing Sheets

(51) Int. Cl.
 *B01D 33/04* (2006.01)
 *B01D 33/044* (2006.01)
(58) Field of Classification Search
 USPC ......... 210/167.21, 167.22, 167.27, 232, 238,
 210/400, 401; 119/259, 260, 226, 227
 See application file for complete search history.

(56) References Cited

FOREIGN PATENT DOCUMENTS

| | | | | | |
|---|---|---|---|---|---|
| DE | 4014038 | A1 | * | 11/1991 | |
| DE | 20 2018 005636 | U1 | | 5/2019 | |
| DE | 202018005637 | U1 | * | 8/2019 | |
| DE | 102020100873 | A1 | * | 7/2021 | |
| GB | 2552008 | A | * | 1/2018 | ........... A01K 63/045 |

OTHER PUBLICATIONS

Machine-generated English translation of DE 202018005637, generated on May 30, 2024.*
Machine-generated English translation of DE 4014038, generated on May 30, 2024.*
Machine-generated English translation of DE 207269655, generated on May 30, 2024.*
Machine-generated English translation of CN 212731253, generated on May 30, 2024.*
International Search Report and Written Opinion issued Dec. 2, 2022 in PCT/IL2022/050594.
International Preliminary Report on Patentability issued Aug. 31, 2023 in PCT/IL2022/050594.

* cited by examiner

FLEECE FILTERS FOR USE IN AQUATIC INSTALLATIONS

CROSS-REFERENCE TO RELATED APPLICATIONS

This application is a Section 371 of International Application No PCT/IL2022/050594, filed Jun. 3, 2022, which was published in the English language on Dec. 15, 2022, under International Publication No. WO 2022/259239 A1, which claims priority under 35 U.S.C. § 119(b) to Israeli Application No. 283846 filed Jun. 9, 2021, the disclosures of each of which are incorporated herein by reference.

FIELD OF THE INVENTION

The invention relates to improvements in fleece filters for use in aquatic installations.

BACKGROUND OF THE INVENTION

Fish or coral hosting installations, for example, aquariums and ponds typically employ a multitude of mechanical, biological and chemical water filter components to provide continuous water filtration. Typically, aquarium systems employ a secondary water container known as a sump that is located in a cabinet below the aquarium to house filter components. Water is allowed to flow by pipes from the aquarium into the sump by gravity and is pumped back up into the aquarium by a main circulation pump. Access to in-sump water filter arrangements for maintenance purposes is relatively awkward due to space constraints and single side access. When the main circulation pump is switched off for maintenance activities, feeding aquarium inhabitants, and the like, the water height in the sump will rise due to back syphoning of water from the aquarium down to the sump.

One type of mechanical filter designed to remove suspended particles from water is a so-called fleece filter which includes a feed reel for holding a fleece roll dispensing fresh fleece, a take-up reel for taking up soiled fleece, and an upright filter chamber. The filter chamber has a polluted water inlet in flow connection with an aquarium for an inflow of polluted water therefrom. The filter chamber returns filtered water to the sump for being pumped back to the aquarium. The filter chamber has a fleece lined grating and a fleece retainer at a lower portion of the filter chamber to ensure fleece is lining the grating at all times and specifically when fleece is being advanced from the feed reel to the take-up reel. Fleece filters preferably have a positive head pressure to provide a continuous filtering process. This is achieved by a difference in the water height inside the filter chamber and the surrounding water level in the sump. As the fleece in the filter chamber traps suspended particulate matter, the fleece gradually becomes blocked thereby preventing free flow of water outwardly through the fleece to the surrounding sump. Such gradual blocking causes the water height inside the filter chamber to correspondingly gradually rise so that the water can flow through fresh fleece that was previously above the water line. Typically, a fleece filter is open topped so that when the fleece is completely blocked and the water has risen to the top of the filter chamber, the water overflows from the filter chamber back into the surrounding sump as unfiltered polluted water. Advancing fleece through the filter chamber introduces fresh fleece causing the water height in the filter chamber to drop and restore filtering action.

Fleece filters are available in mechanical versions requiring human intervention to periodically roll soiled fleece onto a take-up reel thereby dispensing fresh fleece and electromechanical versions including a fleece filter controller for periodically driving a take-up reel motor as triggered by a water height sensor for sensing a predetermined water level inside a filter chamber. Suitable water height sensors include inter alia electro-mechanical float switches, optical sensors, electrical conductivity sensors, capacitive sensors and the like. Commercially available fleece filters include inter alia Clarisea fleece filter units www.theaquariumsolution.com/products/clarisea-fleece-filter-units, Rollermat fleece filter units www.theiling-ap.com, Deltec fleece filter units www.deltec-aquaristic.com/en/products, and the like.

Fleece filters face numerous operational challenges as follows: Water may inadvertently contain relatively large or sharp-edged particles. Over time marine mollusks, for example, sea snails, with sharp or pointed shells can grow inside fleece filters. Such particles or mollusks may lead to blocking advancement of fleece or tearing of fleece during its advancement. An aquarist manually rotating a take-up reel in a mechanical fleece filter checks for such occurrences.

There is need for improved fleece filters to reduce or substantially obviate the above challenges.

SUMMARY OF THE INVENTION

The present invention is directed towards improvements in fleece filters for deployment in aquatic installations.

In accordance with one aspect of the present invention, a fleece filter includes a filter chamber and a fleece retainer for intimately retaining fleece against inside primary filter chamber plates on being extended between a feed reel and a take-up reel. The fleece retainer is manually slidingly downwardly insertable into the filter chamber for intimately retaining fleece against the inside primary filter chamber plates and manually slidingly upwardly removable therefrom for releasing fleece from the primary filter chamber plates. The fleece retainer doubles as a diffuser of polluted water by way of being in flow communication with a polluted water inlet provided in the filter chamber. The fleece retainer is selectively sealed and unsealed from the filter chamber's polluted water inlet such that the fleece retainer enables fleece filter maintenance without having to interrupt the inflow of polluted water. Such fleece filter maintenance includes inter alia replacing an empty fleece roll by a new fleece roll, freeing particles preventing fleece advancement, handling a tear in a partially consumed fleece roll, and the like.

In accordance with another aspect of the present invention, a fleece filter includes a fleece filter controller having a feed reel with a feed reel encoder for enabling accurate measurement of fresh fleece dispensed from a fleece roll wherein a length of fresh fleece is a function of a fleece roll's instantaneous external diameter, fleece thickness, and a number of rotations of fleece unwound from a feed reel. Accordingly, the fleece filter controller enables dispensing the same preset length of fresh fleece per each advancement of fresh fleece from the beginning of a fleece roll to its end. Consequently, the fleece filter controller is capable providing an alert to an aquarist regarding the need to replace a fleece roll towards the end of its fresh fleece. The fleece filter controller can be provided with additional sensors for providing additional information and alerts. The fleece filter controller can be an IoT device for enabling mobile alerts to be transmitted to an aquarist's smartphone, laptop, and the like.

In accordance with yet another aspect of the present invention, a fleece filter includes a fleece filter housing having a polluted water inlet, a filtered water outlet and a chemical media basket mounted on the filtered water outlet such that substantially the entire flow of filtered water from the filtered water outlet immediately subsequently passes through the chemical media basket. The fleece filter is designed for convenient access to the chemical media basket for replacing chemical media without having to interrupt operation of the fleece filter.

The different aspects of the present invention can be implemented independently of each other and in combination. Moreover, commercially available fleece filters can be modified to incorporate one or more aspects of the present invention.

BRIEF DESCRIPTION OF THE DRAWINGS

In order to understand the present invention and to see how it can be carried out in practice, preferred embodiments will now be described, by way of non-limiting examples only, with reference to the accompanying drawings, in which similar parts are likewise numbered, and in which.

DETAILED DESCRIPTION OF THE DRAWINGS

Figure 1:
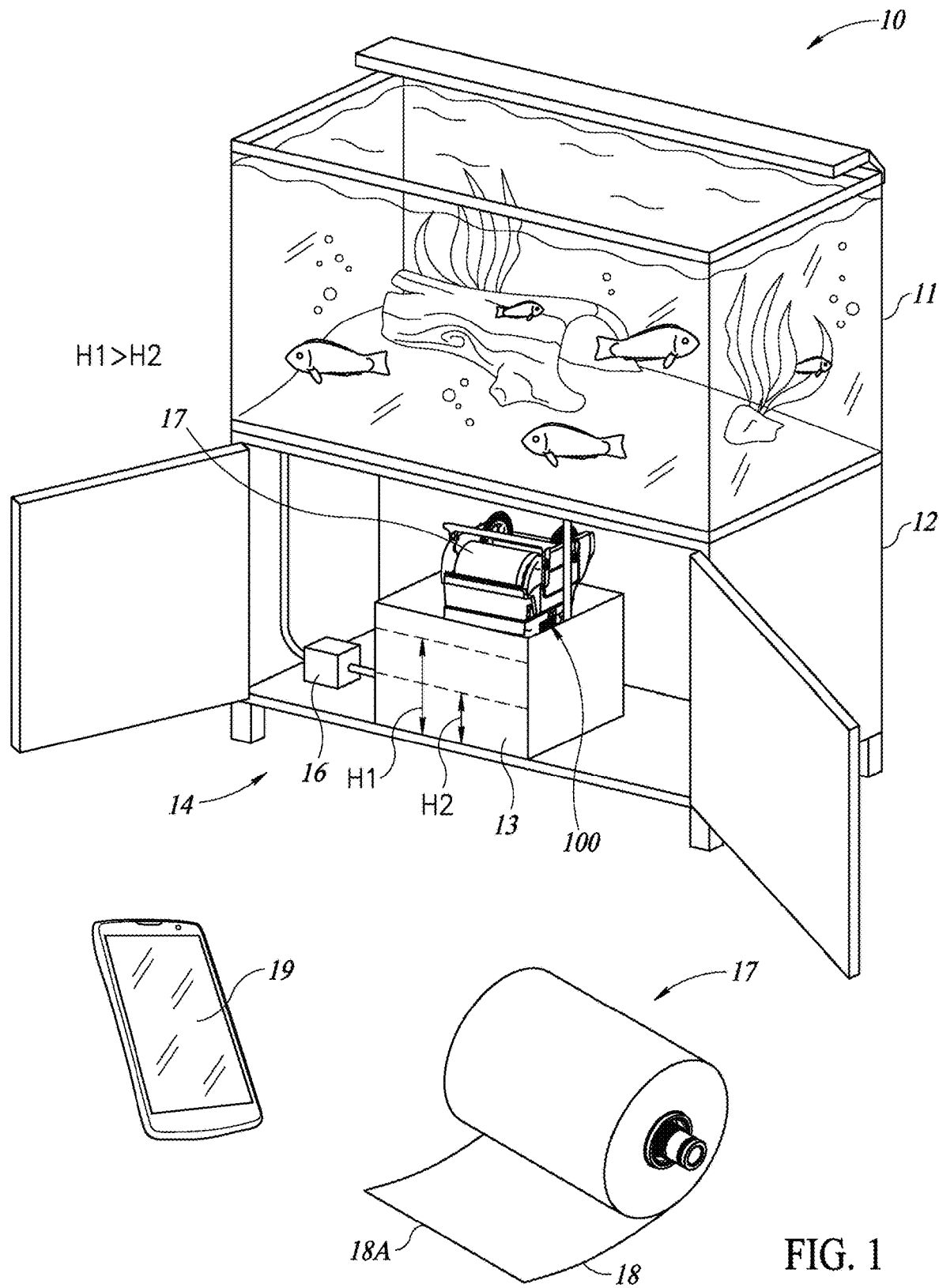
FIG. 1 is a pictorial view of an aquatic installation housing a fleece filter and a fleece roll.
Figure 2:
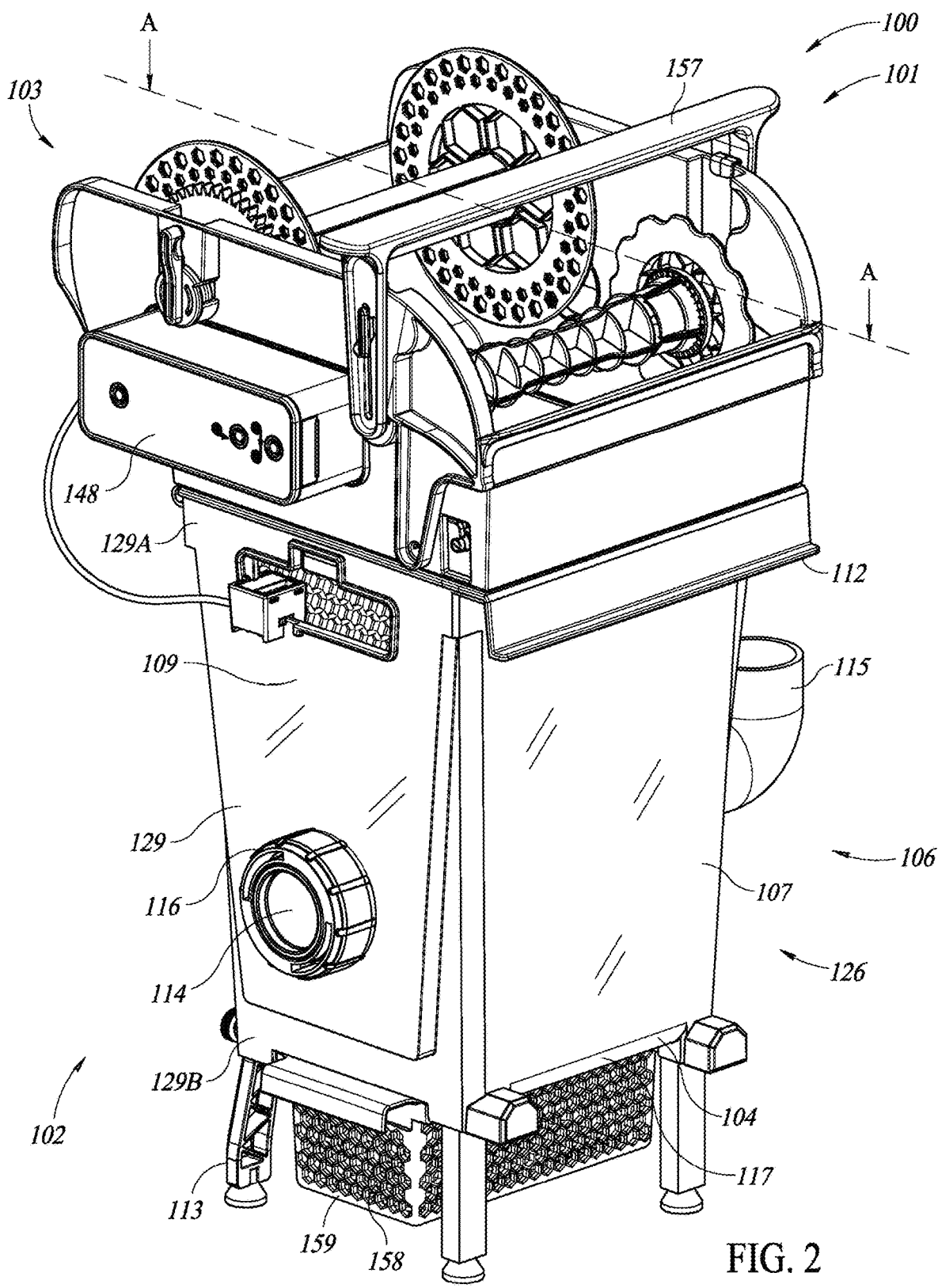
FIG. 2 is a front perspective view of the fleece filter having a supplementary feed reel support in a closed upright position.
Figure 3:
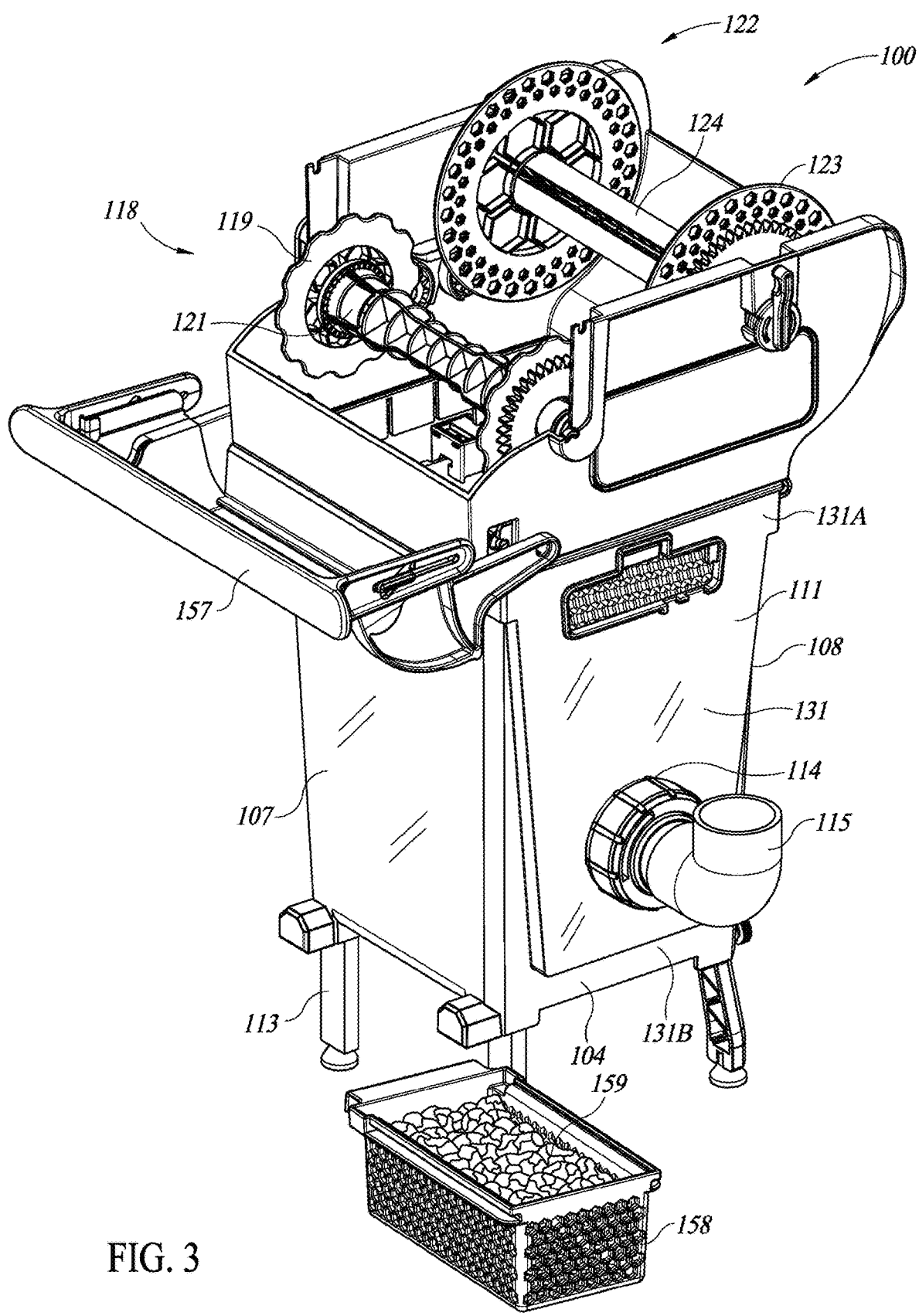
FIG. 3 is a front perspective view of the fleece filter having the supplementary feed reel support in an extended horizontal position.
Figure 4:
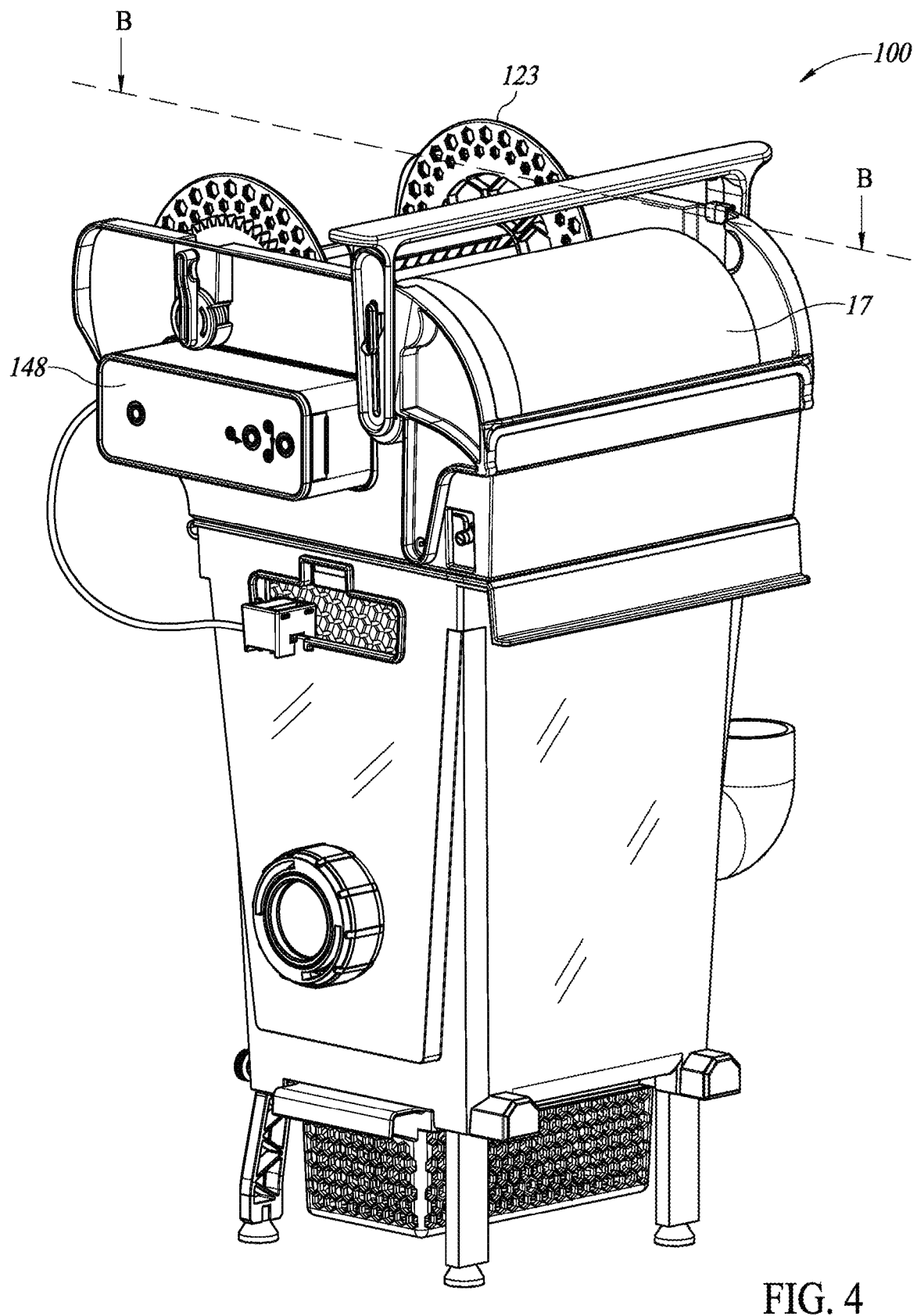
FIG. 4 is a front perspective view of the fleece filter loaded with a new fleece roll.
Figure 5A:
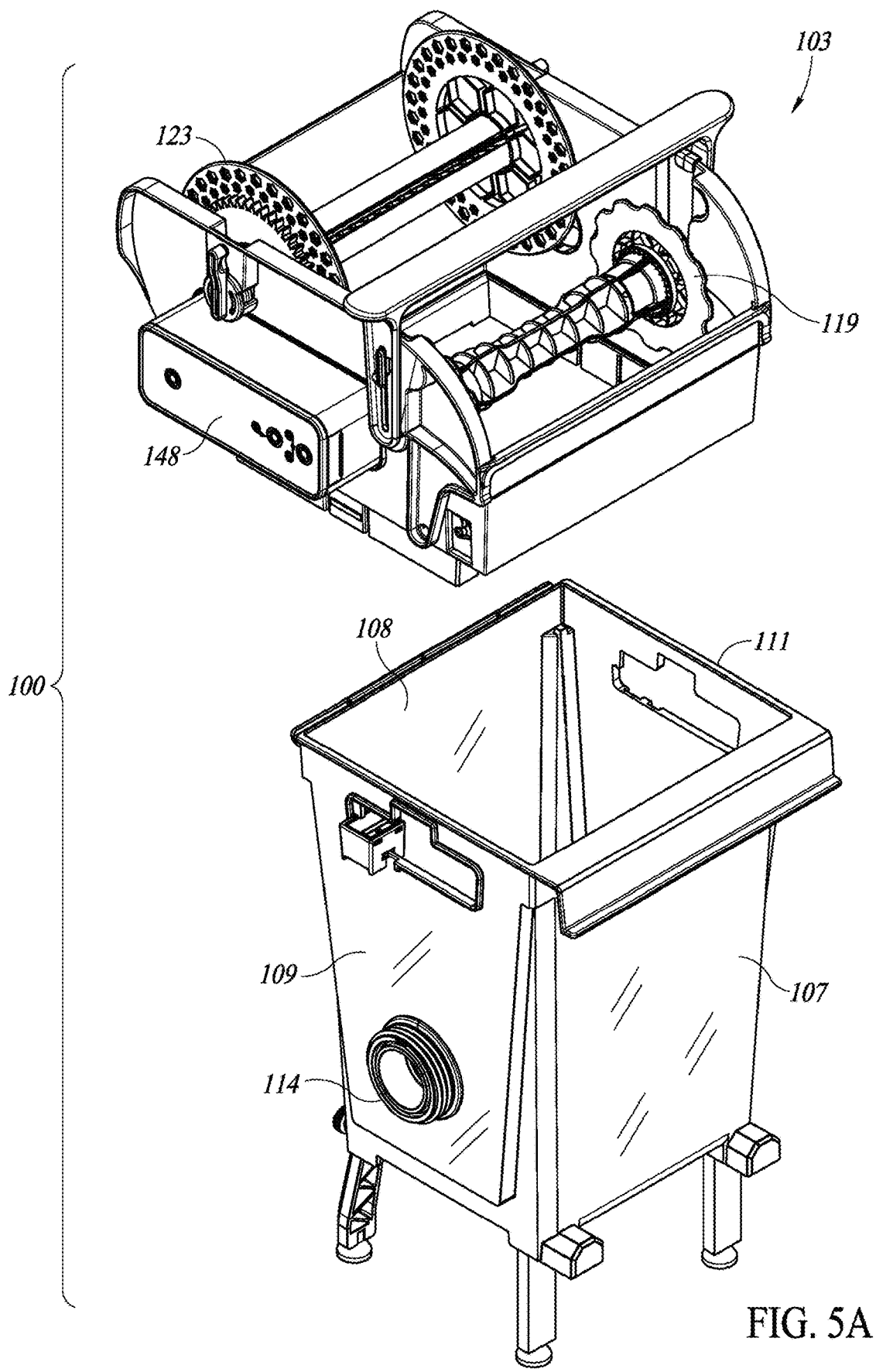
FIG. 5A is a partial exploded view of the fleece filter.
Figure 5B:
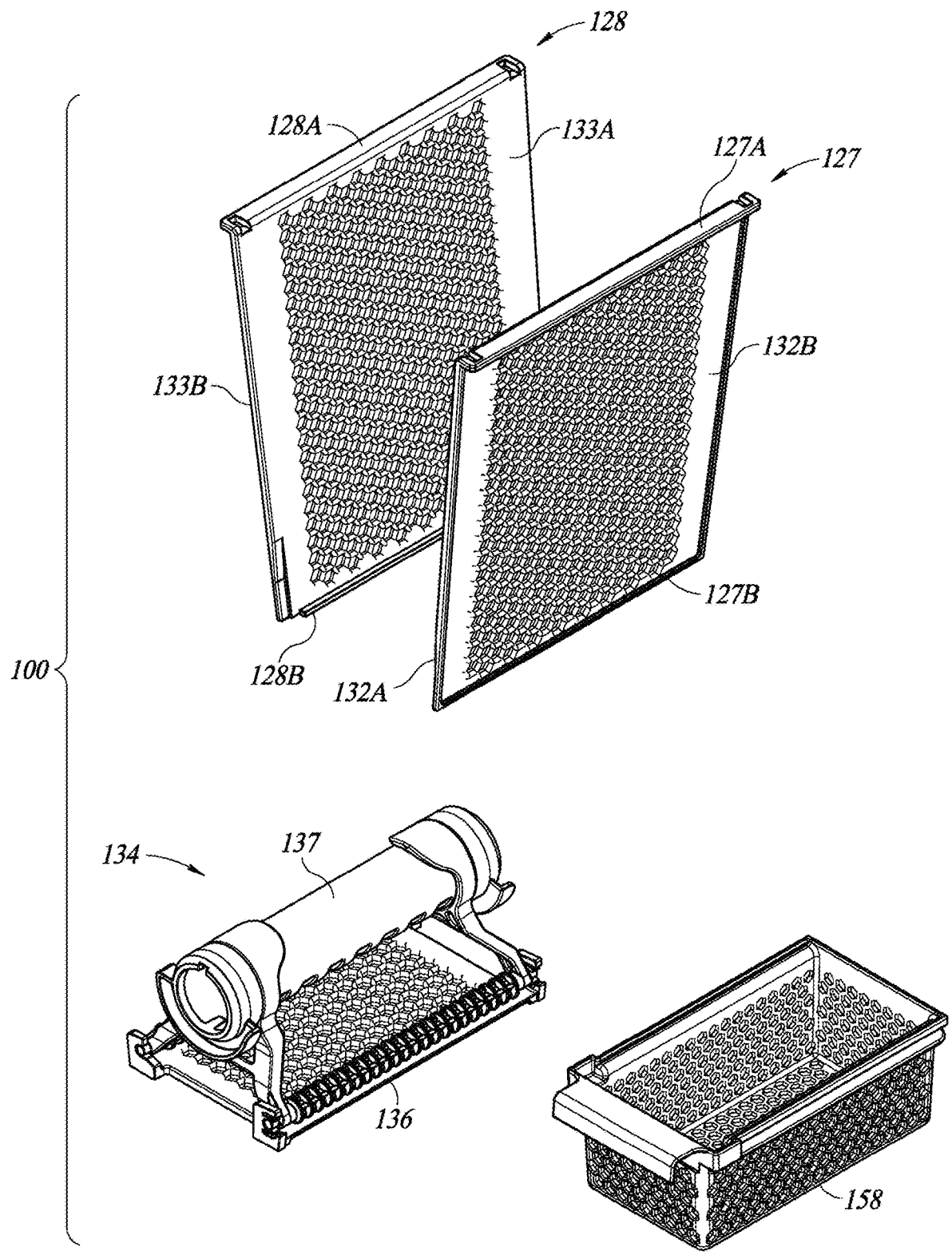
FIG. 5B is a continuation of FIG. 5A's partial exploded view.
Figure 6:
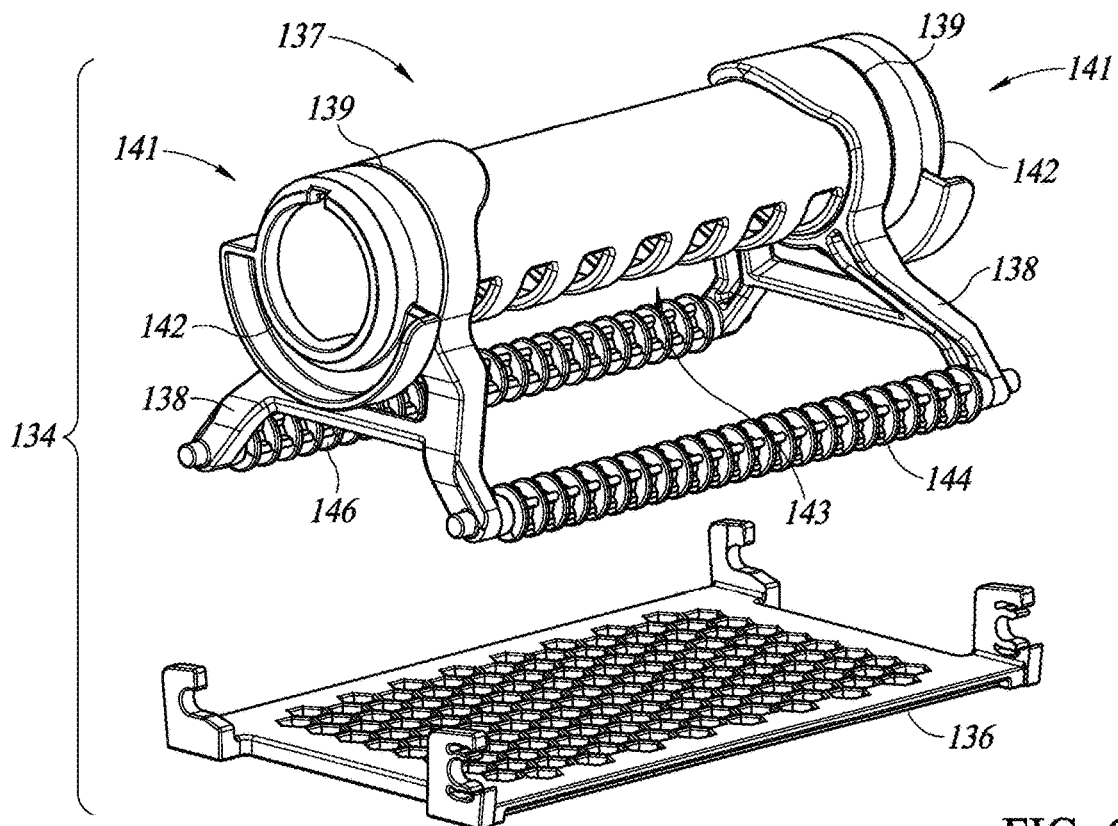
FIG. 6 is a close-up view of a fleece retainer of the fleece filter.
Figure 7:
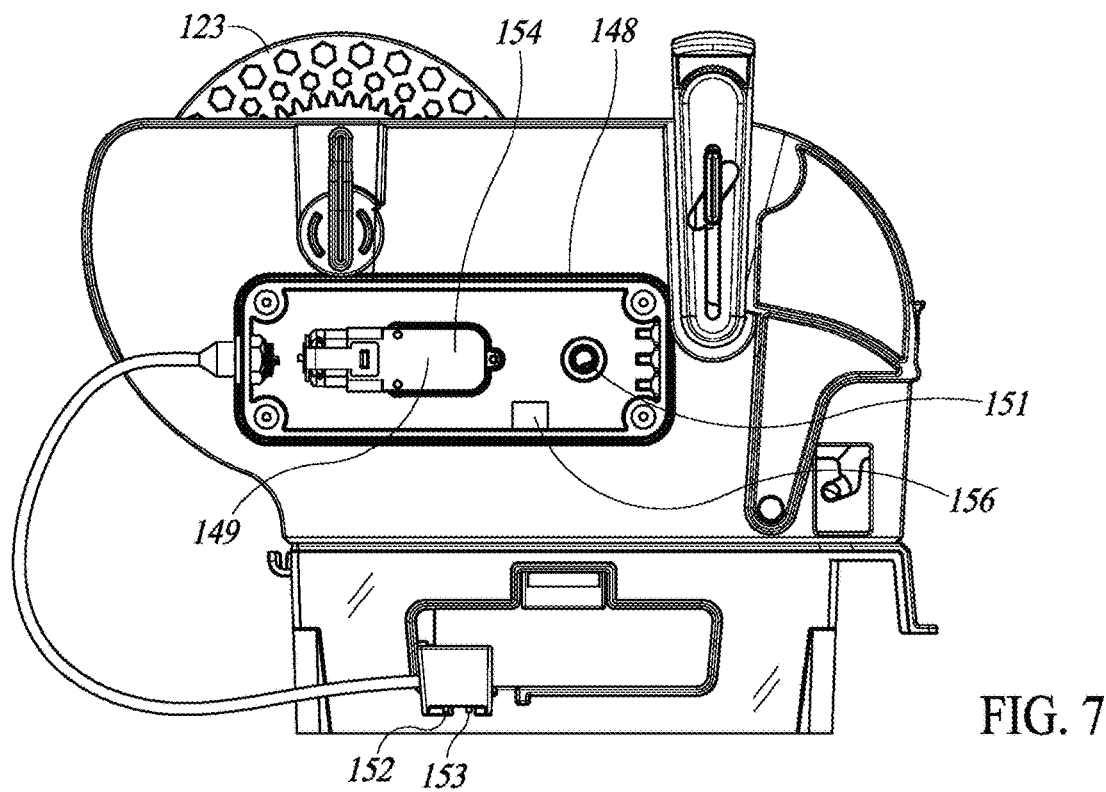
FIG. 7 is a close-up view of a fleece filter controller of the fleece filter.
Figure 8:
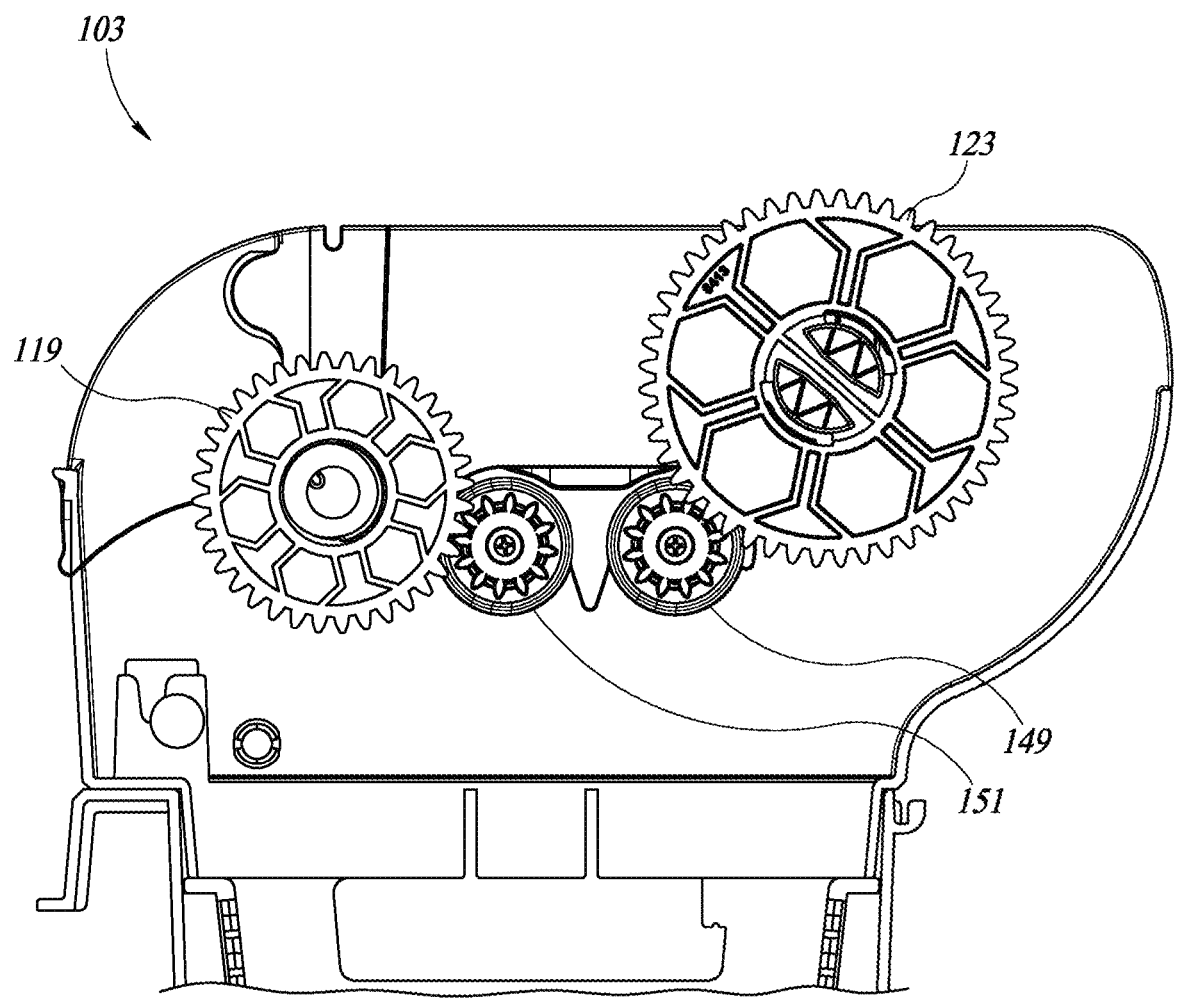
FIG. 8 is a close-up view of a take-up reel motor and a feed reel encoder of the fleece filter controller.

FIG. 1 shows an aquatic installation 10 including an aquarium 11 mounted on a cabinet 12 housing a sump 13 for accommodating a water filtering arrangement 14. Water flows from the aquarium 11 into the sump 13 by gravity and is pumped back up into the aquarium 11 by a main circulation pump 16. The water filtering arrangement 14 includes a fleece filter 100 for use with a fleece roll 17 having fresh fleece 18 including a free fleece end 18A. Fleece rolls 17 can be supplied in different lengths. Fleece 18 can be provided in different thicknesses and having different properties such as mesh size for filtering pollutants from polluted water. The fleece filter 100 can be an IoT device for wireless connection with a smartphone application 19, for example, Applicant's ReefBeat smartphone application.

The sump 13's water height depends on operation of the main circulation pump 16 as follows: Without operation of the main circulation pump 16, the sump 13's water level is standing water height H1. On continuous operation of the main circulation pump 16, the sump's water level is standing water height H2 where H1>H2. On interruption of operation of the main circulation pump 16, for example, during feeding of aquarium inhabitants, maintenance purposes and the like, the water level rises from standing water height H2 to standing water height H1.

FIG. 2 to FIG. 11 show the fleece filter 100 removed from the sump 13. The fleece filter 100 includes an upright filter housing 101 having a dual section construction as follows: a lower filter housing section 102 and an upper filter housing section 103. The lower filter housing section 102 includes a filter housing base 104 and a filter housing peripheral wall 106. The filter housing peripheral wall 106 is preferably transparent so that a user can inspect the fleece filter 100's interior without having to remove the upper filter housing section 103. Notwithstanding the filter housing peripheral wall 106 is transparent, FIG. 2 to FIG. 4 do not show the fleece filter 100's interior since its intricate construction as described hereinbelow cannot be clearly shown.

The filter housing peripheral wall 106 includes a front filter housing wall 107, a rear filter housing wall 108 opposite the front filter housing wall 107, a left filter housing wall 109 and a right filter housing wall 111 opposite the left filter housing wall 109. The front filter housing wall 107 preferably includes a front filter housing wall rim 112 for hanging the fleece filter 100 on the sump 13. Alternatively, the fleece filter 100 can be mounted on legs 113 for standing in the sump 13.

The left filter housing wall 109 and the right filter housing wall 111 each has a polluted water inlet 114 for enabling an inflow of polluted water into the filter housing 101. The polluted water inlets 114 are preferably below the standing water height H2 for silent operation of the fleece filter 100. A user connects an inlet pipe 115 for supplying polluted water to one polluted water inlet 114 and screw threads a nut 116 to seal the other polluted water inlet 114 thereby enabling a user to conveniently locate the fleece filter 100 in the sump 13. The filter housing base 104 includes a filtered water outlet 117 for enabling an outflow of filtered water from the fleece filter 100. The filter housing base 104 is preferably formed as a grating such that it doubles as the filtered water outlet 117.

The upper filter housing section 103 includes a feed reel support 118 toward the front filter housing surface 107 for rotatably supporting a feed reel 119 with a feed spindle 121 for holding a fleece roll 17. The upper filter housing section 103 includes a take-up reel support 122 towards the rear filter housing wall 108 for rotating supporting a take-up reel 123 with a take-up spindle 124 for taking up soiled fleece. The feed reel 119 and the take-up reel 123 are opposite one another. Soiled fleece is preferably directly taken-up on the take-up spindle 124. The take-up reel 123 has a greater diameter than the feed reel 119 because soiled fleece has a greater thickness than fresh fleece.

The lower filter housing section 102 accommodates a filter chamber 126 for filtering an inflow of polluted water through fleece extending from the feed reel 119 to the take-up reel 123 to an outflow of filtered water. The filter chamber 126 is formed by a pair of opposite upright spaced apart primary filter chamber plates 127 and 128 correspondingly parallel to the front filter housing wall 107 and the rear filter housing wall 108 and extending widthwise between the left filter housing wall 109 and the right filter housing wall 111. Accordingly, the left filter housing wall 109 and the right filter housing wall 111 double as a pair of opposite upright spaced apart secondary filter chamber plates 129 and 131 transverse to the pair of opposite upright spaced apart primary filter chamber plates 127 and 128.

The pair of opposite upright spaced apart primary filter chamber plates 127 and 128 include a front primary filter chamber plate 127 and a rear primary filter chamber plate 128. The primary filter chamber plates 127 and 128 have uppermost primary filter chamber plate edges 127A and 128A and lowermost primary filter chamber plate edges 127B and 128B, respectively. The secondary filter chamber plates 129 and 131 having uppermost secondary filter chamber plate edges 129A and 131A and lowermost secondary filter chamber plate edges 129B and 131B, respectively. The primary filter chamber plates 127 and 128 have inside primary filter chamber plate surfaces 132A and 133A facing towards one another and outside primary filter chamber plate surfaces 132B and 133B correspondingly facing the front filter housing wall 107 and the rear filter housing wall 108. The primary filter chamber plates 127 and 128 are preferably entirely formed as gratings for being intimately lined by fleece 18 extending between the feed reel 119 and the take-up reel 123.

The fleece filter 100 includes a fleece retainer 134 towards the respective lowermost primary filter chamber plate edges 127B and 128B and lowermost secondary filter chamber plate edges 129B and 131B for intimately retaining fleece 18 against the inside primary filter chamber plate surfaces 132A and 133A on being extended between the feed reel 119 and the take-up reel 123. The fleece retainer 134 preferably constitutes a horizontal filter chamber base between the primary filter chamber plates 127 and 128 and the secondary filter chamber plates 129 and 131.

The fleece retainer 134 includes a planar fleece retainer base member 136 and a detachable fleece retainer handle 137 with a pair of opposite upright fleece retainer handle supports 138 for snap-fit mounting on the fleece retainer base member 136. The fleece retainer handle 137 includes opposite fleece retainer handle ends 139. The fleece retainer handle ends 139 have bayonet fittings 141 for sealing attachment to the polluted filter inlets 114. The fleece retainer handle 137 is hollow therealong and accordingly the fleece retainer handle ends 139 constitute fleece retainer inlet ports 142. The fleece retainer handle 137 has a fleece retainer outlet port 143 intermediate the fleece retainer handle ends 139 and in flow communication with the fleece retainer inlet ports 142. The fleece retainer outlet port 143 preferably faces downwards towards the filter housing base 104 on secure attachment of the fleece retainer 134 in the fleece housing 101.

The fleece retainer handle 137 includes a front fleece retainer handle roller 144 and a rear fleece retainer handle roller 146 extending between the opposite upright fleece retainer handle supports 138. The fleece retainer 134 is designed such that fleece extends between the front fleece retainer handle roller 144 and the rear fleece retainer handle roller 146 and the fleece retainer base member 136. Accordingly, the lower filter housing section 102 and the filter chamber 126 bound a cavity 147 surrounding the filter chamber 126 on its frontside, lowerside and rearside for receiving filtered water after passing through fleece.

The fleece filter 100 includes a electric powered fleece filter controller 148 having the following components: A take-up reel motor 149 for driving the take-up reel 123 to take-up soiled fleece and a feed reel encoder 151 driven by the feed reel 119 as the take-up reel motor 149 drives the take-up reel 123. A filter chamber water height sensor 152 for sensing water level in the filter housing 101 and the filter chamber 126 which are the same at a predetermined filter chamber water height H3. An external water height sensor 153 for sensing water level external to the filter housing 101 in the sump 13 at a predetermined external water height H4. The filter chamber water heights H3 and the external water height H4 are preferably the same. The take-up reel motor 149 includes a current sensor 154 for measuring current for operating same. A data logger 156 for logging fleece consumption data, and the like. The fleece filter controller 148 is preferably an IoT device for enabling mobile alerts to be transmitted to an aquarist's smartphone, laptop, and the like.

Figure 9:
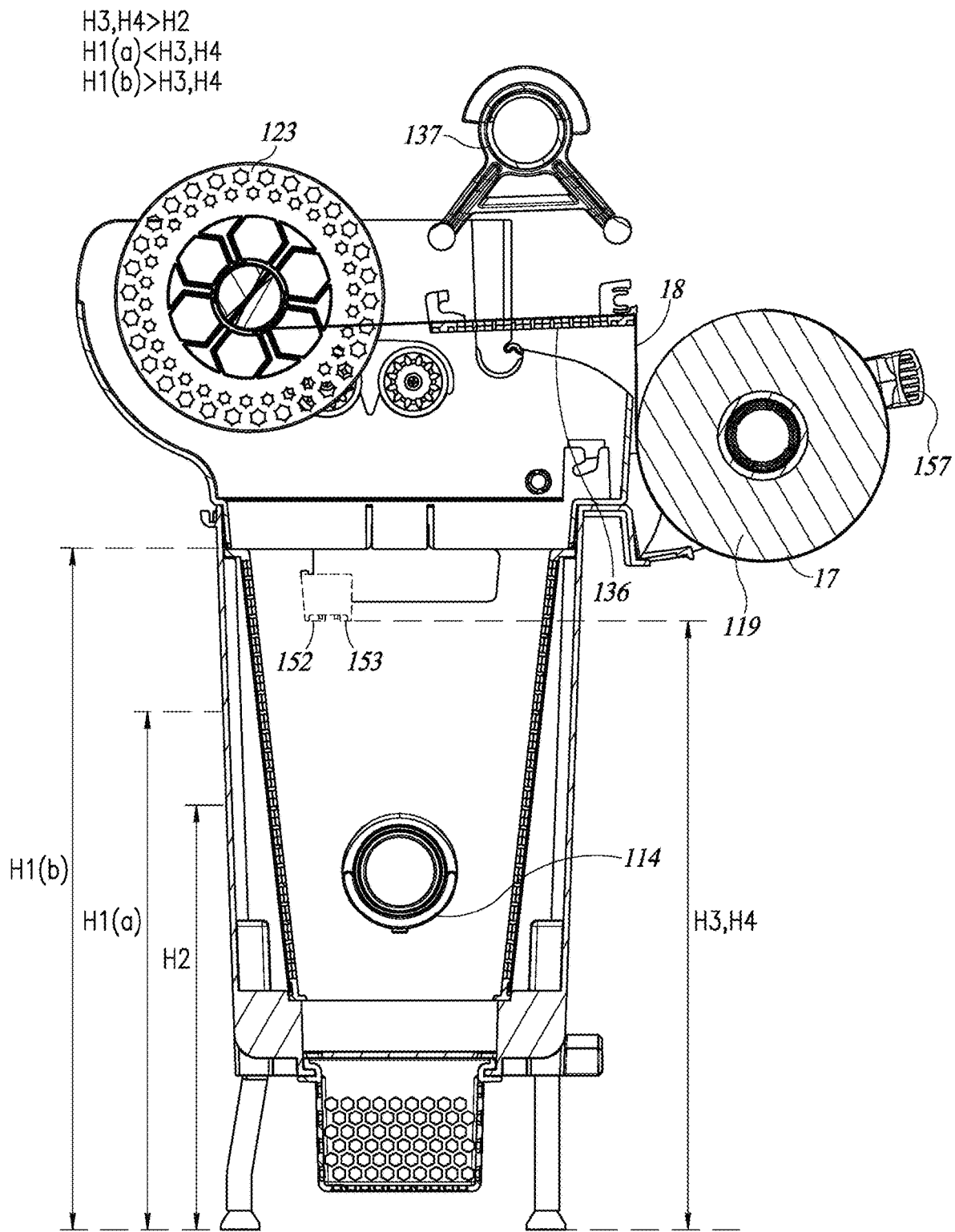
FIG. 9 is a longitudinal cross section of the fleece filter along FIG. 2's line A-A showing an initial threading of new fleece.

FIG. 9 shows the locations of the filter chamber water height sensor 152 and the external water height sensor 153 for explanatory purposes of the operation of the fleece filter 100 as follows: The fleece filter 100 is set up such that the filter chamber water height sensor 152 and the external water height sensor 153 are necessarily above the standing water height H2 to ensure a positive head pressure to push polluted water through fleece 18. The aquatic installation 10 can be set up such that the standing water height H1 can be above or below the filter chamber water height sensor 152 and the external water height sensor 153. The aquatic installation 10 is typically set up such that its standing water height H1 is below the filter chamber water height sensor 152 and the external water height sensor 153. Such standing water height is denoted H1($a$) where H1($a$)<H3, H4. Alternatively, in the case the standing water height H1 is above the filter chamber water height sensor 152 and the external water height sensor 153, then such standing water height is denoted H1($b$) where H1($b$)>H3, H4.

The fleece filter controller 148 employs the filter chamber water height sensor 152 for acting as a trigger to operate the take-up reel motor 149 to advance fresh fleece 18 into the filter chamber 126. The fleece filter controller 148 can be set to advance different lengths of fleece from the feed reel 119 from a short advancement of, say, 3 cm, to full replacement from the feed reel 119 to the take-up reel 123. The length of fresh fleece being dispensed from the feed reel 119 is a function of the fleece roll's instantaneous external diameter, fleece thickness, and the number of rotations of the feed reel. Since a fleece roll's initial external diameter is known along with its fleece thickness, the feed reel encoder 151 enables the same preset length of fresh fleece 18 to be dispensed from the feed reel 119 per each advancement of fresh fleece.

In the case that the standing water height H1($b$)>H3, H4, the fleece filter controller 148 employs the external water height sensor 153 as follows: On interruption of operation of the main circulation pump 16, the sump 13's water level increases from the standing water height H2 to the standing water height H1(*b*). Similarly, the fleece filter's water level increases from its instantaneous water height to the standing water height H1(*b*). As described hereinabove with reference to the standing water height H1(*a*), on the water level reaching the filter chamber water height sensor 152, the fleece filter controller 148 operates the take-up reel motor 149 to advance fresh fleece 18. In the case of the standing water height H1(*b*)>H3, H4, this would lead to continuous operation of the take-up reel motor 149 until the fleece roll 17 was exhausted. To preclude such continuous operation, in an instance the external water height sensor 153 detects water level has reached the predetermined external water height H4, the external water height sensor 153 stops the fleece filter controller 148 operating the take-up reel motor 149.

On operation of the take-up reel motor 149 to dispense fresh fleece from the feed reel 119, the fleece filter controller 148 monitors the feed reel encoder 151 and the current sensor 154 to determine two possible error conditions as follows. If the feed reel encoder 151 does not show dispensing of fresh fleece, then this can be indicative of either torn fleece 18 or blocked advancement. The two error conditions can be distinguished by the current sensor 154. In the former, the current sensor 154 reads normal current for operating the take-up reel motor 149. In the latter, the current sensor 154 reads a higher than normal current for operating the take-up reel motor 149. Accordingly, the fleece filter controller 148 interrupts operation of the take-up reel motor 149 and preferably issues a user alert.

The filter housing 101 includes a supplementary feed reel support 157 for supporting the feed reel 119 during maintenance of the fleece filter 100 when the cabinet 12 is open and particularly during replacing an empty fleece roll by a new fleece roll. The supplementary feed reel support 157 is pivotally mounted on the filter housing 101 between a normally closed upright position during operation of the fleece filter 100 (see FIG. 2) and an open horizontal position extending beyond the filter housing peripheral wall 106 (see FIG. 3).

The fleece filter 100 preferably includes a chemical media basket 158 mounted on the filtered water outlet 117 such that filtered water immediately passes therethrough. The chemical media basket 158 is preferably slidably mounted under the filter housing base 104 for sliding in a left right direction for enabling convenient access thereto without having to change the position of the fleece filter 100 in the sump 13. The chemical media basket 158 contains chemical media 159, for example, active charcoal, which requires periodic replacement.

Figure 10:
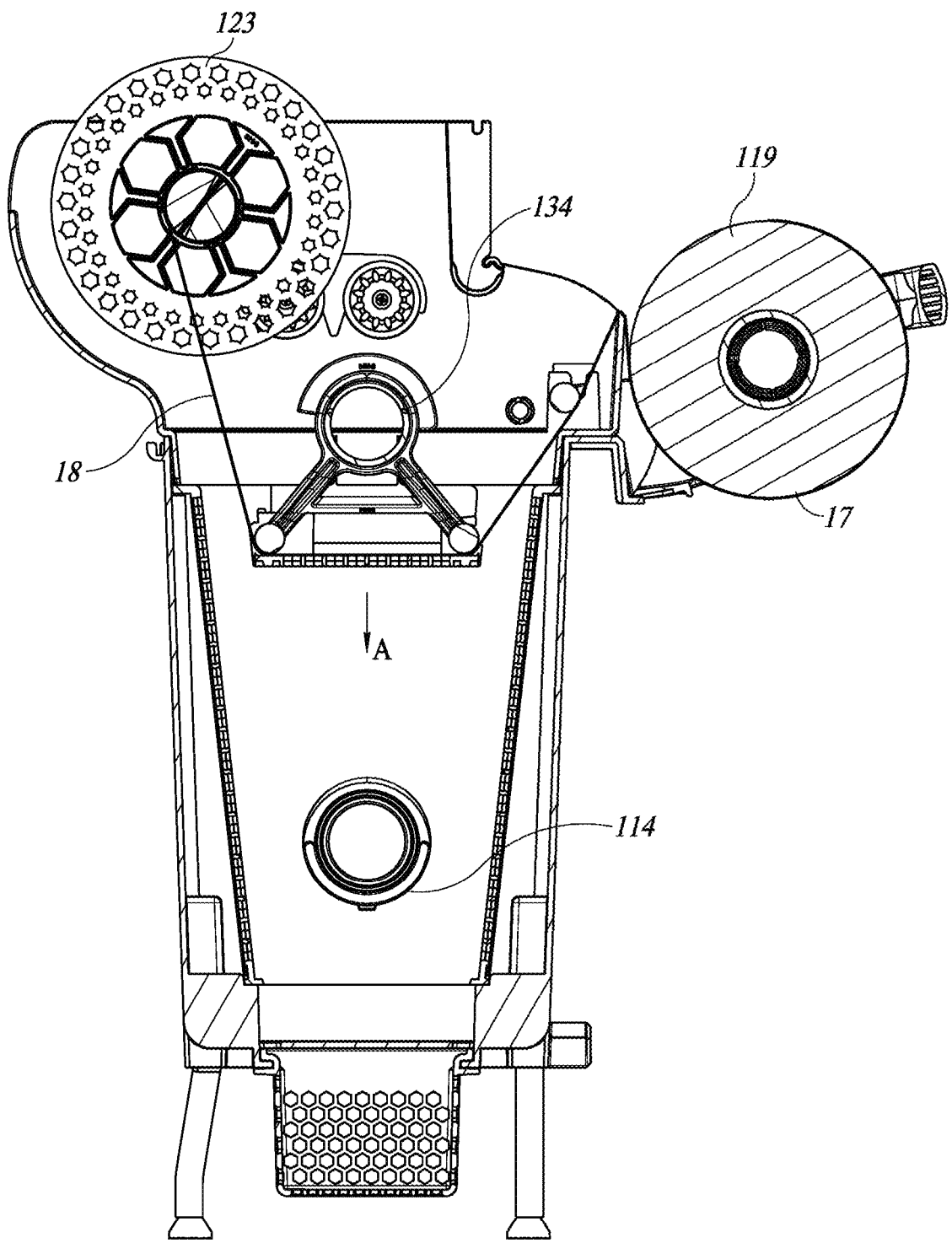
FIG. 10 is a longitudinal cross section of the fleece filter along FIG. 2's line A-A showing a downward sliding insertion of the fleece retainer towards its position for retaining fleece.
Figure 11:
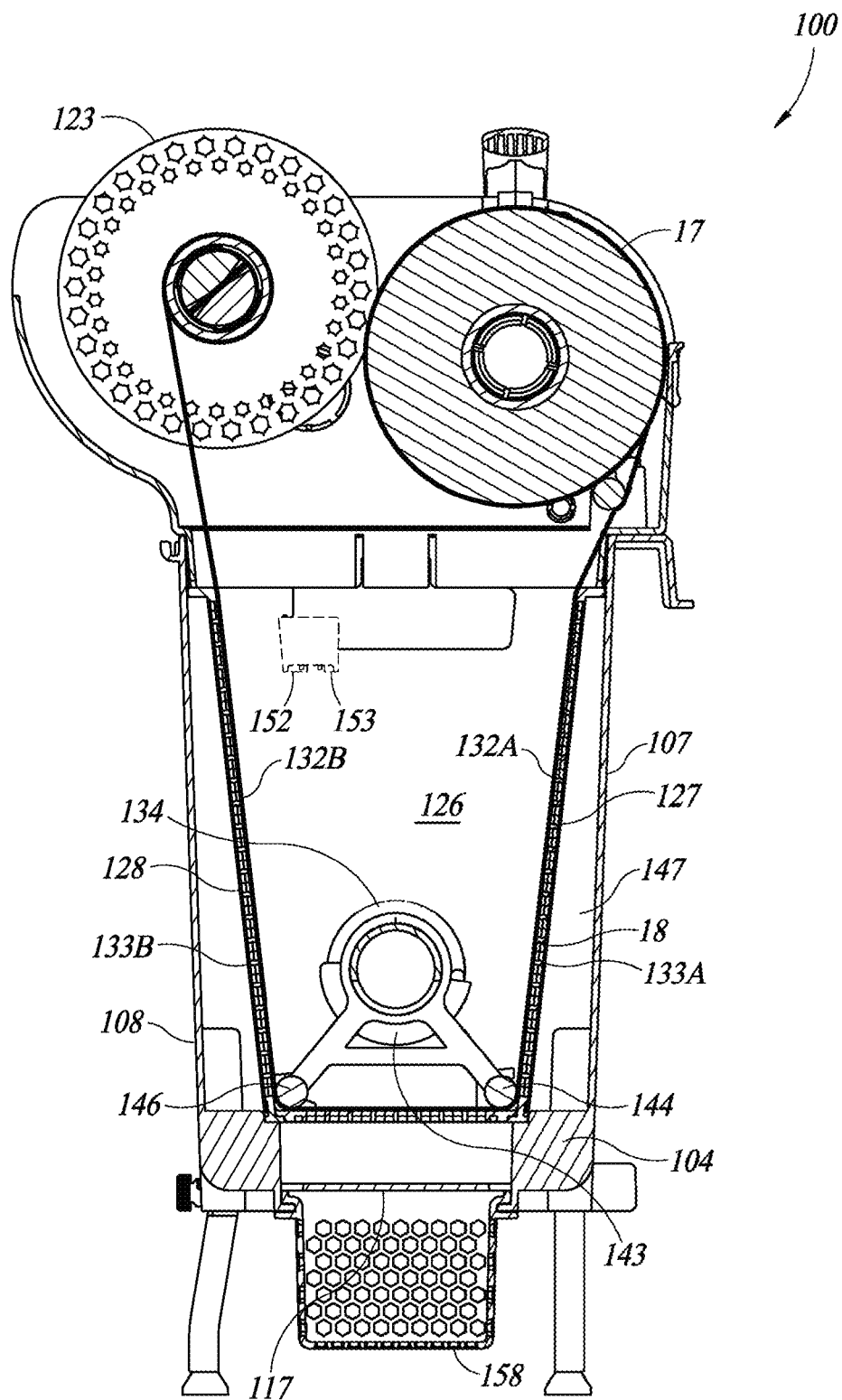
FIG. 11 is a longitudinal cross section of the fleece filter along FIG. 2's line A-A showing the fleece retainer retaining fleece.

FIG. 9 to FIG. 11 show setting up the fleece filter 100 with a new fleece roll 17 with fresh fleece 18 having free fleece end 18A, after the fleece retainer 134 is removed from the fleece filter 100. A user mounts the new fleece roll 17 on the feed reel 119, opens the supplementary feed reel support 157 and mounts the feed reel 119 thereon. The user detaches the fleece retainer handle 137 from the fleece retainer base member 136. The user extends the free fleece end 18A horizontally from the feed reel 119 to the take-up reel 123. The user securely attaches the free fleece end 18A to the take-up reel 123. The user entraps fleece between the fleece retainer handle 137 and the fleece retainer base member 136.

FIG. 10 shows the user slowly and carefully downwardly slides the fleece retainer 134 towards the filter housing base 104 in the direction of arrow A for dispensing fresh fleece from the fleece roll 17. The user continues to slide the fleece retainer 134 towards the two polluted water inlets 114 for securing the fleece retainer 134 thereon by rotating the fleece retainer handle 137 with respect to the fleece retainer base member 136 to secure the bayonet fittings 141 onto the polluted filter inlets 114. The user moves the feed reel 119 from the supplementary feed reel support 157 and places it on the feed reel support 118 and returns the supplementary feed reel support 157 to its closed position.

FIG. 11 shows the fleece filter 100 after it has been loaded with a new fleece roll 17 and the fleece 18 lines the front primary filter plate inside surface 132A from the feed reel 119 to the front fleece retainer handle roller 144, wraps inwardly around the front fleece retainer handle roller 144 to overlie the fleece retainer base member 136 to the rear fleece retainer handle roller 146, wraps upwardly around the rear fleece retainer handle roller 146 to line the rear primary filter plate surface 133A to the take-up reel 123.

Figure 12:
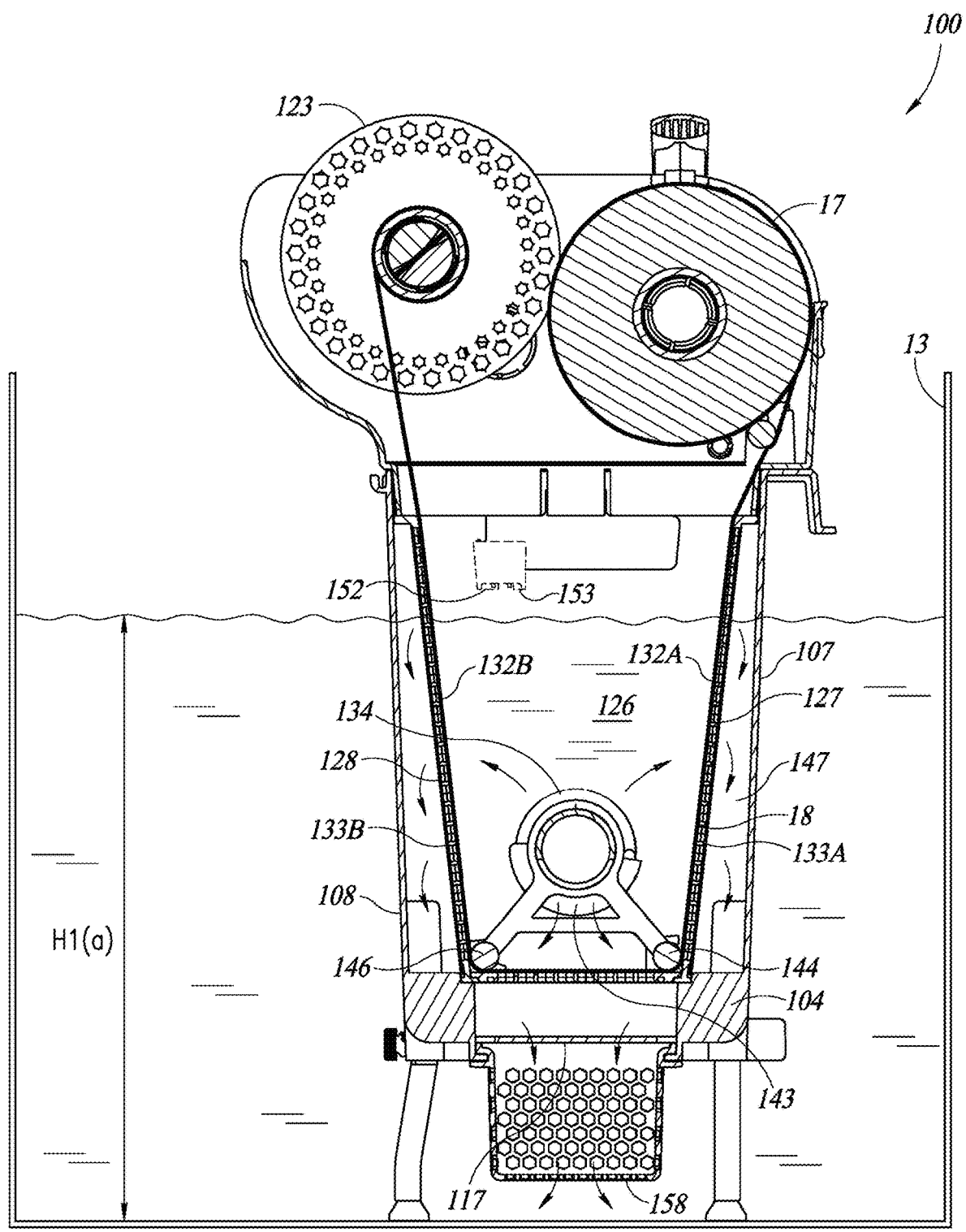
FIG. 12 is a longitudinal cross section of the fleece filter along FIG. 4's line B-B wherein the fleece filter has a new fleece roll and before operation of the main circulation pump.
Figure 13:
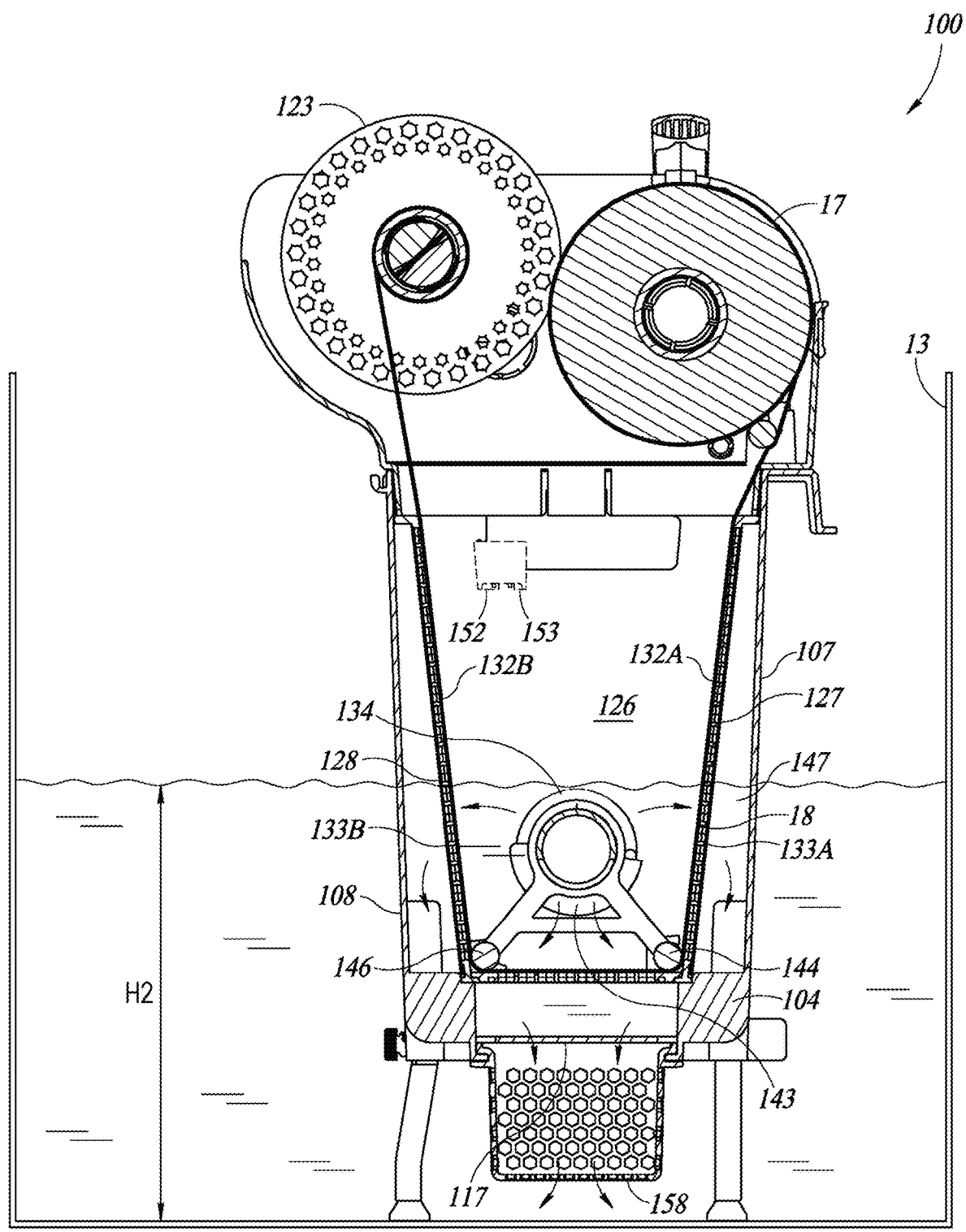
FIG. 13 is a longitudinal cross section of the fleece filter along FIG. 4's line B-B wherein the fleece filter has a new fleece roll and after operation of the main circulation pump.
Figure 14:
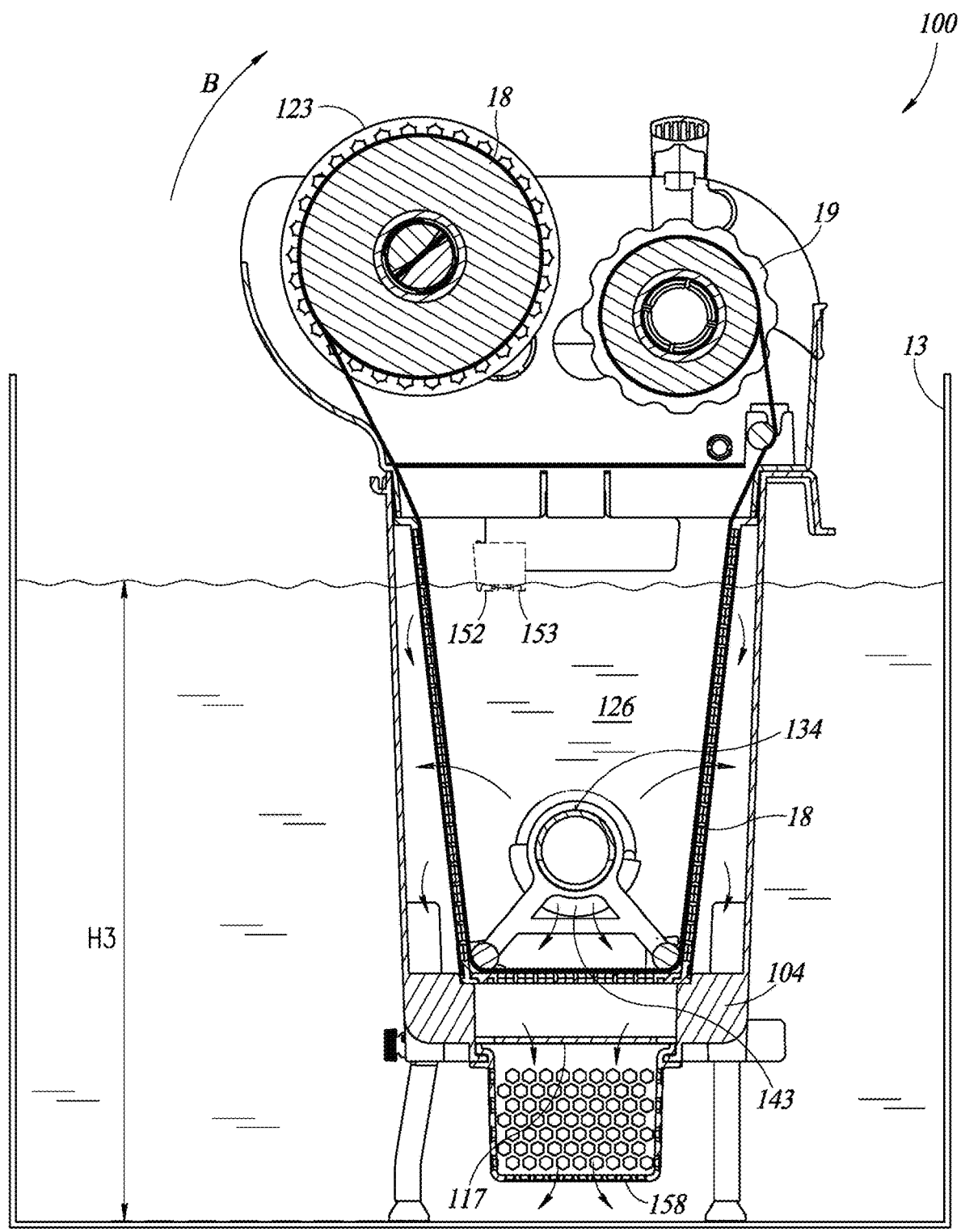
FIG. 14 is a longitudinal cross section of the fleece filter along FIG. 4's line B-B wherein the fleece filter after taking-up some soiled fleece is being operated to dispense a predetermined length of fresh fleece.

FIG. 12 to FIG. 14 show the operation of the fleece filter 100 deployed in the sump 13 having a standing water height H1(*a*) without operation of the main circulation pump 16. The fleece filter 100 is fitted with a fresh fleece roll 17. Before operation of the main circulation pump 16, the water level in the sump 13 and the fleece filter 100 are the same standing water height H1(*a*) as shown in FIG. 12. On operation of the main circulation pump 16, the water levels in the sump 13 and the fleece filter 100 drop to the standing water height H2 as shown in FIG. 13. The flow of water through the fleece filter 100 is then as follows: Polluted water flows from the inlet pipe 115 to the polluted water inlet 114. Polluted water flows from the polluted water inlet 114 into the filter chamber 126 via the fleece retainer outlet port 143. Polluted water flows from the filter chamber 126 to the cavity 147 passing through fleece 18 for being filtered by same. Filtered water flows from the cavity 147 to the filtered water outlet 117. Filtered water flows from the filtered water outlet 117 through the chemical media basket 158 into the sump 13 for circulation to the aquarium 11.

On continued operation of the main circulation pump 16, the sump 13's water level remains at the standing water height H2 but the filter chamber's 126's water level begins to rise as fleece 18 begins to become soiled and therefore less permeable. When the filter chamber 126's water level reaches the filter chamber water height sensor 152's predetermined filter chamber water height H3, the fleece filter controller 148 drives the take-up reel motor 149 to dispense a predetermined length of fresh fleece from the feed reel 119 by taking up the same length on the take-up reel 123 as denoted by arrow B. On dispensing fresh fleece 18, the filter chamber 126's water level drops below the predetermined filter chamber water height H3. The drop in the filter chamber 126's water level is a function of the predetermined length of fresh fleece dispensed from the feed reel 119. The greater the predetermined length of soiled fleece taken up on the take-up reel 123 so the greater the drop in the filter chamber 126's water level below the predetermined filter chamber water height H3. The maximum drop of the filter chamber 126's water level is down to the standing water height H2.

The sequence of periodically taking up soiled fleece and dispensing fresh fleece repeats itself until the fleece roll 17 is fully dispensed. The data logger 156 can store consumed fleece lengths such that the fleece filter controller 148 can issue an alert to the user when the fleece roll 17 is approaching to be fully dispensed. On operation of the take-up reel motor 149 to dispense fresh fleece from the feed reel 119, the fleece filter controller 148 monitors the feed reel encoder 151 and the current sensor 154 as described hereinabove. On interruption of the operation of the main circulation pump 16, the filter chamber 126's water level begins to rise as does the sump 13's water level begins to raise from the standing water height H2 to the standing water height H1(a).

In the case that without operation of the main circulation pump 16, the sump 13 has a standing water height H1(b), then the external water height sensor 153 precludes the fleece filter controller 148 operating the take-up reel motor 149 to prevent its continuous operation.

While the invention has been described with respect to a limited number of embodiments, it will be appreciated that many variations, modifications, and other applications of the invention can be made within the scope of the appended claims.

The invention claimed is:

1. A fleece filter for use in an aquatic installation, the fleece filter for use with a fleece roll of fresh fleece with a free fleece end, the fleece filter comprising:
   (a) a feed reel for holding the fleece roll for dispensing fresh fleece;
   (b) a take-up reel opposite said feed reel for taking up soiled fleece;
   (c) an upright filter chamber including:
      i) a pair of opposite upright spaced apart primary filter chamber plates having uppermost primary filter chamber plate edges, lowermost primary filter chamber plate edges and inside primary filter chamber plate surfaces facing towards one another,
      ii) a pair of opposite upright spaced apart secondary filter chamber plates transverse to said pair of opposite upright primary filter chamber plates, said pair of secondary filter chamber plates having uppermost secondary filter chamber plate edges and lowermost secondary filter chamber plate edges, and a secondary filter chamber plate of said pair of secondary filter chamber plates including a polluted water inlet for enabling an inflow of polluted water; and
   (d) a fleece retainer towards said lowermost primary filter chamber plate edges and said lowermost secondary filter chamber plate edges for intimately retaining fleece against said inside primary filter chamber surfaces on being extended between said feed reel and said take-up reel,
   said fleece retainer being manually sliding downwardly insertable into said filter chamber for intimately retaining fleece against said inside primary filter chamber place surfaces and manually sliding upwardly removable therefrom for releasing fleece from said inside primary filter chamber plate surfaces without interruption of said inflow of polluted water into the fleece filter,
   said fleece retainer including a fleece retainer inlet for flow communication with said polluted water inlet on deployment of said fleece retainer in said filter chamber,
   said fleece retainer including a fleece retainer outlet in flow communication with said fleece retainer inlet, whereby said fleece retainer enables said inflow of polluted water from said polluted water inlet into said filter chamber via said fleece retainer inlet and said fleece retainer outlet,
   said inflow of polluted water being filtered to an outflow of filtered water on passing outwardly through an intimately fleece lined grating formed in at least one of said pair of primary filter chamber plates and said fleece retainer.

2. The filter according to claim 1 wherein said fleece retainer constitutes a horizontal filter chamber base between said pair of lowermost primary filter chamber plate edges and said pair of lowermost secondary filter chamber plate edges.

3. The filter according to claim 1 wherein said fleece retainer includes a fleece retainer base member and a detachable fleece retainer handle for mounting thereon wherein fleece extends between said detachable retainer handle and said fleece retainer base member.

4. The filter according to claim 3 wherein said filter retainer handle includes a front roller adjacent a front primary filter chamber plate of said pair of primary filter chamber plates and a rear roller adjacent a rear primary filter chamber plate of said pair of primary filter chamber plates.

5. The filter according to claim 1 wherein each secondary filter chamber plate of said pair of secondary filter chamber plates includes a polluted water inlet wherein a first polluted water inlet of said pair of polluted water inlets enables said inflow of polluted water and a second polluted water inlet of said pair of polluted water inlets is sealed.

6. The filter according to claim 1 and further comprising a supplementary feed reel support for supporting the feed reel, said supplementary feed reel support being pivotally mounted between a normally closed upright position during operation of the fleece filter and an open horizontal position during maintenance of the fleece filter.

7. The filter according to claim 1 and further comprising:
   a filter housing enclosing said upright filter chamber, said filter housing including a filtered water outlet for enabling said outflow of filtered water, and
   a chemical media basket mounted on said filtered water outlet such that said outflow of filtered water immediately passes through said chemical media basket.

8. The filter according to claim 1 and further comprising a fleece filter controller including:
   i) a take-up reel motor for driving said take-up reel for taking up soiled fleece whereby fresh fleece is dispensed from the fleece roll,
   ii) a filter chamber water height sensor for sensing a water level of said fleece filtering arrangement at a predetermined filter chamber water height, and
   iii) a feed reel encoder driven by said feed reel on operation of said take-up reel motor for enabling a predetermined length of fresh fleece to be dispensed from said feed reel on said filter chamber's water level reaching said predetermined filter chamber water height.

9. The filter according to claim 8 wherein said fleece filter controller is configured, on operation of said take-up reel motor, to interrupt said operation of said take-up reel motor on an instance of said feed reel encoder not detecting rotation of said feed reel.

10. The filter according to claim 8 wherein said fleece filter controller further includes a current sensor for measuring current for operating said take-up reel motor and wherein said fleece filter controller is configured, on operation of said take-up reel motor, to interrupt said operation of said take-up reel motor on an instance said feed reel encoder not detecting rotation of said feed reel and said current sensor detecting a higher than normal current for operating said take-up reel motor.

11. The filter according to claim 8 wherein said fleece filter controller further includes an external water height sensor for detecting water level external to said filter chamber at a predetermined external water height and said fleece filter controller is configured not to operated said take-up reel motor on an instance of said external water height sensor detecting the water level external to said filter chamber at said predetermined external water height.

12. The filter according to claim 8 wherein said fleece filter controller is an IoT device for providing mobile alerts.

* * * * *